(12) United States Patent
Rastegar et al.

(10) Patent No.: US 6,832,781 B2
(45) Date of Patent: Dec. 21, 2004

(54) SAFETY LOCK FOR CHILD VEHICLE SEATS

(75) Inventors: Jahangir S. Rastegar, Stony Brook, NY (US); Thomas Spinelli, E. Northport, NY (US)

(73) Assignee: Omnitek Partners, LLC, Bay Shore, NY (US)

( * ) Notice: Subject to any disclaimer, the term of this patent is extended or adjusted under 35 U.S.C. 154(b) by 0 days.

(21) Appl. No.: 10/123,090

(22) Filed: Apr. 11, 2002

(65) Prior Publication Data

US 2003/0011185 A1 Jan. 16, 2003

Related U.S. Application Data

(60) Provisional application No. 60/283,580, filed on Apr. 13, 2001.

(51) Int. Cl.[7] .............................................. B60R 22/38
(52) U.S. Cl. ..................................................... 280/806
(58) Field of Search ............................. 280/801.1, 806, 280/808; 180/281; 297/468, 476, 478–480

(56) References Cited

U.S. PATENT DOCUMENTS

| | | | | |
|---|---|---|---|---|
| 3,950,826 A | * | 4/1976 | Knoll et al. ................... 24/171 |
| 4,758,048 A | * | 7/1988 | Shuman ....................... 297/468 |
| 4,796,919 A | * | 1/1989 | Linden ........................ 280/808 |
| 4,938,535 A | * | 7/1990 | Condon et al. .............. 297/483 |
| 4,946,198 A | * | 8/1990 | Pittore et al. ................ 280/808 |
| 5,042,838 A | * | 8/1991 | Carter ......................... 280/808 |
| 5,154,446 A | * | 10/1992 | Blake .......................... 280/808 |
| 5,215,333 A | * | 6/1993 | Knight ..................... 280/801.1 |
| 5,476,288 A | * | 12/1995 | Simodi, Jr. ................. 280/808 |
| 5,788,282 A | * | 8/1998 | Lewis ......................... 280/808 |
| 5,839,792 A | * | 11/1998 | Baik .......................... 297/483 |
| 6,203,110 B1 | * | 3/2001 | Proteau et al. .............. 297/483 |
| 2002/0158457 A1 | * | 10/2002 | Simmons ................. 280/801.1 |

* cited by examiner

Primary Examiner—Paul N. Dickson
Assistant Examiner—Laura B. Rosenberg

(57) ABSTRACT

An apparatus for clamping together a first and second web of a vehicle seatbelt is provided. The apparatus includes a first body portion; at least a second body portion connected at least intermediately to the first body portion; a clamp for clamping the first and second body portions such that a transverse portion of the first and second webs is captured between the first and second body portions; and at least one locking member movably connected to at least one of the first and second body portions to prevent axial movement of the first and second webs.

27 Claims, 4 Drawing Sheets

SAFETY LOCK FOR CHILD VEHICLE SEATS

CROSS REFERENCE TO RELATED APPLICATION

This application is a conversion of and claims the benefit of provisional application 60/283,580 filed on Apr. 13, 2002, and which is entitled SAFETY LOCK FOR CHILD VEHICLE SEATS, the disclosure of which is incorporated herein in its entirety by its reference.

BACKGROUND OF THE INVENTION

1. Field of the Invention

The present invention relates generally to safety devices for vehicle seats and, more particularly to a safety lock for a child vehicle seat.

2. Prior Art

Most children seats and other similar seats for automobiles and other vehicles (hereinafter referred to collectively as "child seat") are held down to vehicle seats using the vehicle seat belts. To do so, the vehicle seat belt, with its (usually) male component of the vehicle belt buckle, is passed through the provided openings behind the child seat. The male component of the vehicle seat belt is then engaged with the female component of the buckle and is locked in place. In general, the "loose" vehicle belt, if any, is collected by a spring-operated mechanism to which one end of the belt is attached. The same mechanism provides the means to "lock" the belt in place if the vehicle is suddenly decelerated, for example during an accident, thereby preventing the passenger wearing the belt to be held firmly to the vehicle seat. The advantage of such a mechanism is that the passenger is then free to make relatively slow movements without triggering the locking mechanism. However, when used with child seats, the same mechanism has the disadvantage of allowing the child to slowly move the seat around, thereby leaving certain looseness in the belt which is not collected by the spring mechanism due to friction between the belt and the child seat, etc. In the presence of such looseness in the vehicle seat belt that should firmly hold the child seat, the child seat is free to substantially move (displace or rotate). A possibility is thereby created for the child to be thrown forward or to the side or allowed to be rotated to hit an object such as the front seat or the side roof of the vehicle.

SUMMARY OF THE INVENTION

To avoid the above situation, H shaped elements are generally provided by the child seat manufacturer for locking the vehicle seat belt on both sides of the male component. The H shaped element is to be mounted over the two belts after the belts have been passed through the child seat opening and tightened. As the result, the portion of the vehicle seat belt between its fixed end and the H element is intended to remain tight and hold the child seat relatively fixed to the vehicle seat. However, the proper placement of the H element on the two belts is extremely cumbersome. Firstly, there is very little space available between the child seat and the vehicle seat above the seat buckle to maneuver the H element in place. Secondly, since the belt is initially tightened to tightly hold the child seat, it is very difficult to slide the H element behind the belts and maneuver it in place. As the result, the user either abandons the H element or leaves the child seat prone to the aforementioned seat belt loosening or places it improperly and thereby does not benefit from its protection. In addition to the above problems with the installation of the H elements, the elements themselves are functionally deficient since even when they are installed properly, the belts can be moved slowly pushing and pulling them as does usually happen when the child shifts his/her weight around rigorously or as the vehicle continuously accelerates and decelerates.

An objective of the invention being disclosed is to provide a "seat belt locking device" that is easily installed by the user to lock the belts of the vehicle seat belt following the installation of child seats.

It is another objective of the present invention to provide a "seat belt locking device" with a means to increase its "grip" if attempt is made to loosen the belt, such as due to rigorous shifting of the child weight or due to continuous acceleration and deceleration of the vehicle.

It is another objective of the present invention to provide a "seat belt locking device" that can be readily unlocked and removed.

The first embodiment of the present invention consists of the following main components and generally operates as described:

1. A main frame half (or body portion) to which the "locking" elements are mounted.
2. A "mating" half (or body portions) which is preferably hinged to the main frame half. The pair of overlaying belts to be "locked" to each other are placed between the two halves.
3. A "closing handle" (or clamping means) which is used to close the gap between the aforementioned two halves, and as the result forcibly hold the two belts together.
4. Once the "seat belt locking device" is closed, by pulling one or both belts in an axial direction out of the closed device, the aforementioned locking element (or locking member) is moved, preferably rotationally, to pinch the belts against a provided surface on the main frame. As a result, the belts are even more tightly held together. The more forcefully one or both belts are pulled out of the seat belt locking device, the tighter the locking elements pinches the two belts to each other and to the provided surface on the frame.

BRIEF DESCRIPTION OF THE DRAWINGS

These and other features, aspects, and advantages of the apparatus and methods of the present invention will become better understood with regard to the following description, appended claims, and accompanying drawings where:

FIG. 1 shows a basic configuration of the first embodiment of the invention having first and second body portions which are preferably hinged together at one end, the hinged connection can be either a direct connection or through an intermediate member (not shown). A transverse portion of the seatbelt is captured between the body portions and clamped therein by a clamping means, such as a lever and catch as shown in FIG. 1. The transverse portion of the seatbelt is across the width of the seatbelt indicated by dimension A. Accordingly, the axial direction of the seatbelt is along the length of the seatbelt and indicated by dimension B.

Figure 1:
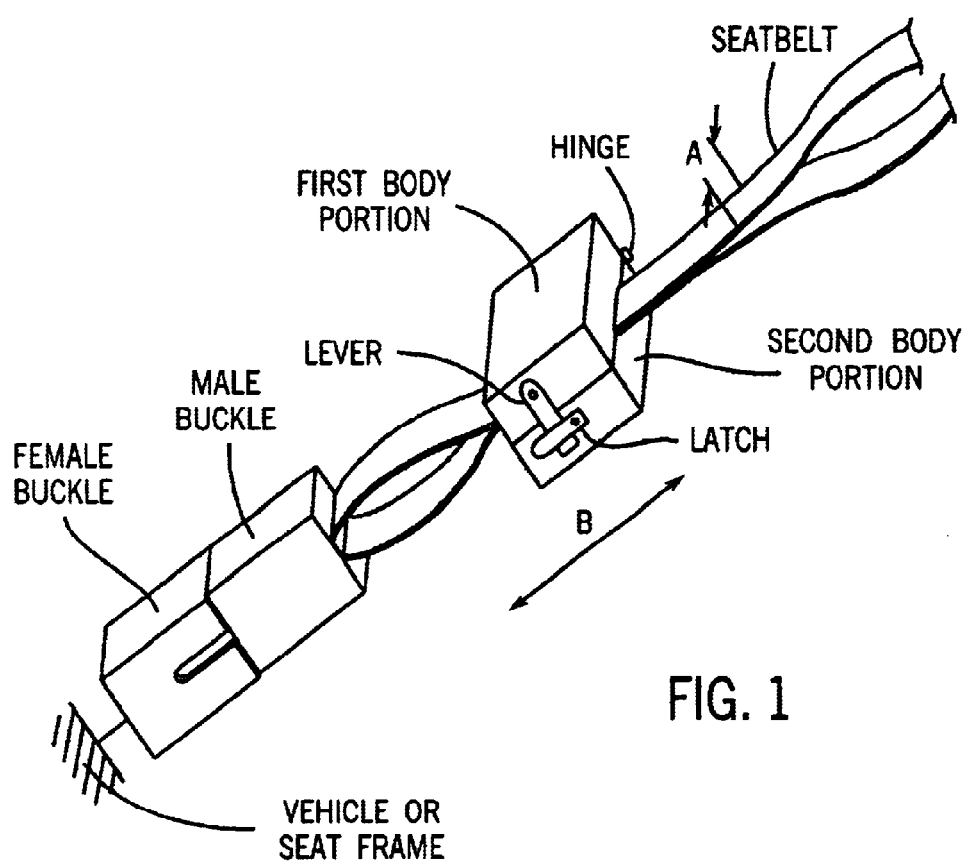
FIG. 1 illustrates an isometric view of a preferred implementation of a seatbelt safety lock of the present invention.
Figure 2:
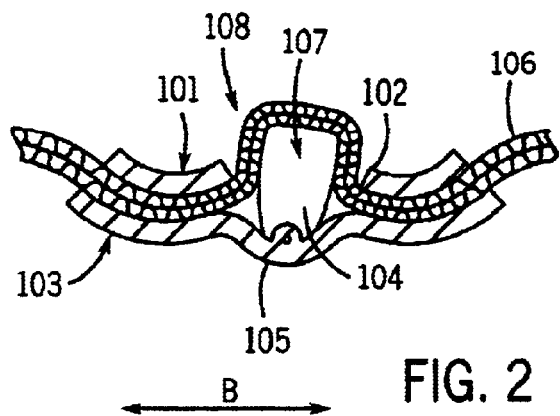
FIG. 2 illustrates a schematic of a first variation of the seatbelt safety lock of FIG. 1.
Figure 4:
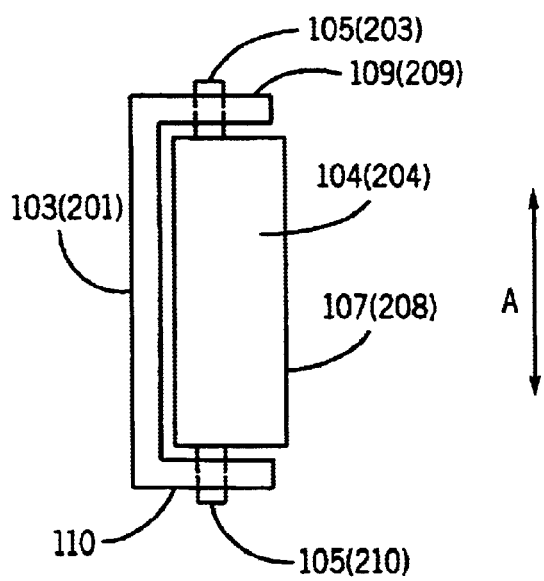
FIG. 4 illustrates a representative side view of the first and second variations of FIGS. 2 and 3.

The schematics of a first version of the first embodiment of the present invention is shown in FIG. 2. The illustration is a cross-section in a plane perpendicular to the plane of the belts. The seat belt locking device 100 consists of one half the frame 101 (body portion) with an opening 108. The opposite half of the "seat belt locking device" (also alternatively referred to as a body portion) is 103 and is formed to closely follow the curvature of the half 101 so that the belts 106 are be held between the two halves with minimal free space. The half 101 has a middle opening through which the belts are pushed by the locking element 104. A rotating locking element (or member) 104 is hinged to the half 103. The locking element 104 is preferably hinged to upper plate 109 and lower plate 110 that extend over the element 104 from the top and bottom of the half 103 as shown in FIG. 4. Once the belts are locked in the seat belt locking device, if the belts are pulled in the axial direction either to the right or to the left, the segment of the belt over the locking element surface 107 will then rotate the locking element clockwise or counterclockwise, respectively, causing the locking element to compress the belts against the edge of the opening 102 in the half 101. The harder the belt is pulled, the tighter the locking element pinches the belts to the edge of the opening 102 in the half 101.

Figure 3:
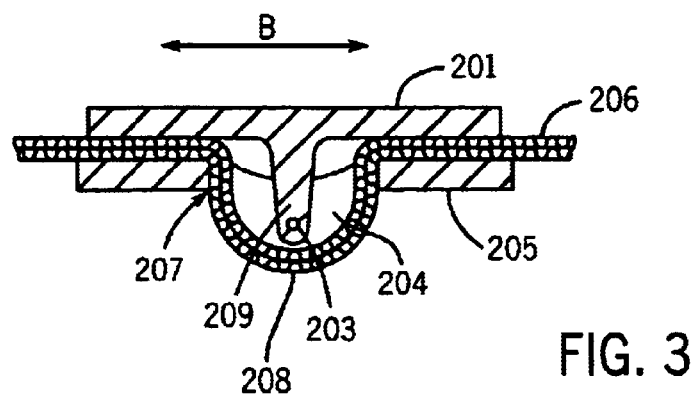
FIG. 3 illustrates a schematic of a second variation of the seatbelt safety lock of FIG. 1.

In another version of the first embodiment of the present invention, similar locking action is provided as shown in the schematic of FIG. 3. The main difference between this and the previous embodiment is the location of the locking device. In this embodiment, the hinge 203 is located away from the half (or body portion) 201. The other half (or body portion) 205 also has an opening 207 through which the locking element (or member) 204 pushes the belts 206. The locking element is similarly hinged to top plate 209 and bottom plate 210 that extends from the half 201, as shown in FIG. 4 in which the reference numbers from the version of FIG. 3 are shown in parenthesis. Once the seat belt locking device is closed, i.e., locks the seat belts together, if pulled, it would tend to rotate the locking element by pulling on the surface 208 of the locking element, thereby forcing the locking element 204 to pinch the belts between itself and edge of the opening in the half 205 similar to what was described for the previous embodiment.

In the above two versions of the first embodiment, the locking elements 104 and 204 were hinged to one half of the seat belt locking device. The locking element may, however, be positioned to slide to the right and to the left by replacing the hinges with sliding slots. In which case, as the belt is pulled to the right (left), the locking element would be forced to essentially translate to the right (left), thereby pinching the belts between the locking element and the edge of the half 101 and 205 opening.

Figure 5:
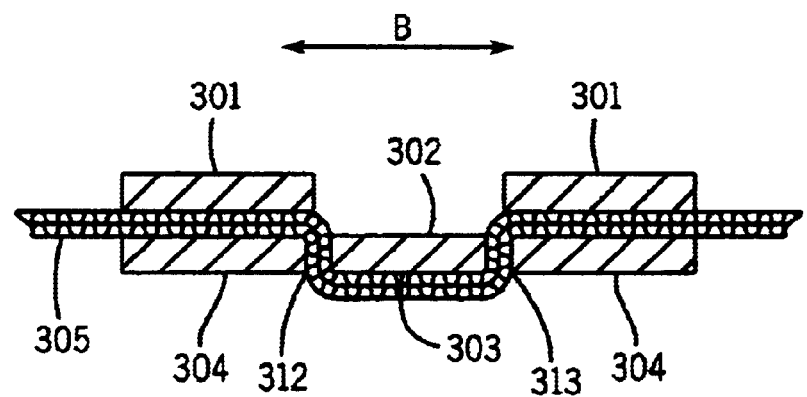
FIG. 5 illustrates a schematic of a third variation of the seatbelt safety lock of FIG. 1.
Figure 6:
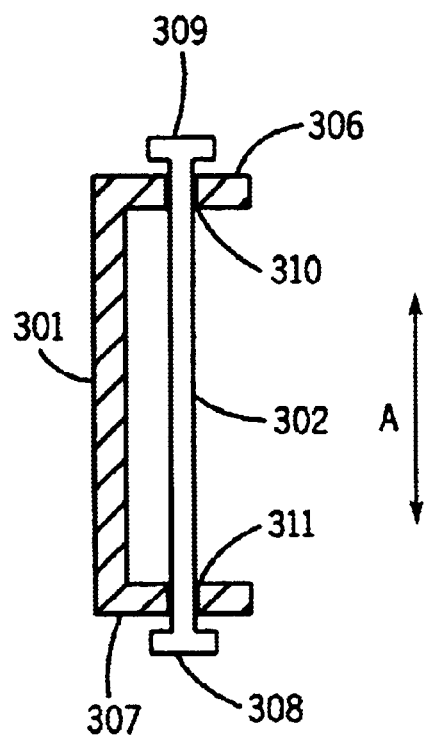
FIG. 6 illustrates a representative side view of the third variation of FIG. 5.

Another version of the first embodiment of the present invention is shown schematically in FIG. 5. The illustration is a cross-section of a plane perpendicular to the plane of the belts. The seat belt locking device halves 301 and 304 are shown to firmly hold the belt. The element 302 acts similar to the previously described locking element (or member). The element 302 is placed in slots 310 and 311 in the top part 306 and bottom part 307 of the device half 301, see FIG. 6 (side view of the device). The element 302 has enlarged ends or alternatively had smaller end but wider than slots body width, so that it is prevented from falling out of the slots but is free to move sideways (in the direction of the length of the belts, in the axial direction B). Once the seat belt locking device is assembled onto the belts, any pulling of the belts from either sides of the device will pull the element 302 in the direction of the pull, thereby pinching the belt between the element 302 and the edges 312 and 313 of the device half 304. The side 303 of the element 302 may be made with a rough surface to aid in pulling the element 302 harder and pinching the belt with an increased force.

In a second embodiment of the present invention, the element 302 is fixed to the top plate 306 and the bottom plate 307. The locking action of the device is then provided by the friction between the belts and the surfaces of the halves 301, 302 and 304. In this embodiment, the device operates essentially like the aforementioned H shaped element with the difference being that it is much easier to deploy since it is constructed as two halves that are positioned around the belts and closed with a closing handle. The device is also readily removable.

Numerous other variations of the aforementioned first embodiment are obviously possible. The described embodiments are primarily intended to present the preferred implementation of the basic design, i.e., a seat belt locking device with one or all of the aforementioned four characteristics and/or modes of operation.

Figure 7:
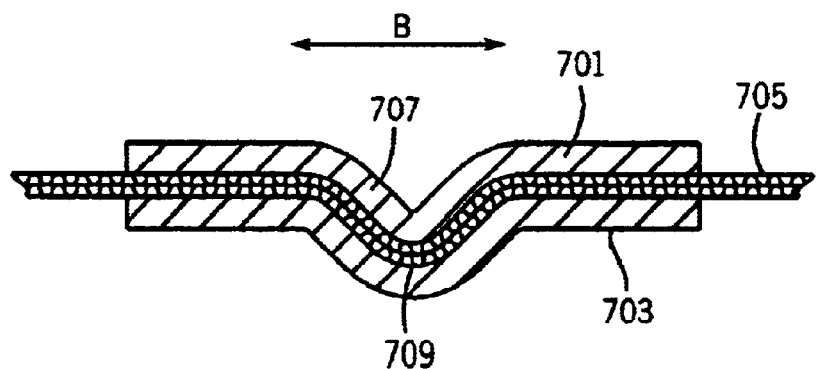
FIG. 7 illustrates a schematic of a fourth variation of the seatbelt safety lock of FIG. 1.

In a third embodiment of the invention, shown in FIG. 7, there is provided an apparatus for clamping together a first and second web of a vehicle seatbelt. The apparatus comprising; a first body potion 701; at least a second body portion 703 connected at least intermediately to the first body portion; a clamping means for clamping the first and second body portions such that a transverse portion of the first and second webs (i.e., the seatbelt) 705 is captured between the first and second body portions; at least one locking member disposed on at least one of the one of the first and second body portions to prevent axial movement of the first and second webs. The first and second body portions as well as the clamping means can be similarly configured as discussed above with respect to the first embodiment. However, the at least one locking member preferably comprises; a v-shaped protrusion 707 disposed on one of the first and second body portions and protruding towards the other of the first and second body portions; and a v-shaped cavity 709 disposed on the other of the first and second body portions and mating with the v-shaped protrusion to clamp the transverse portion of the first and second webs between the v-shaped protrusion and the v-shaped cavity. While the versions of the first embodiment automatically lock the seatbelt from movement in the axial direction, the apparatus of the third embodiment is a manual locking of the element.

Figure 8:
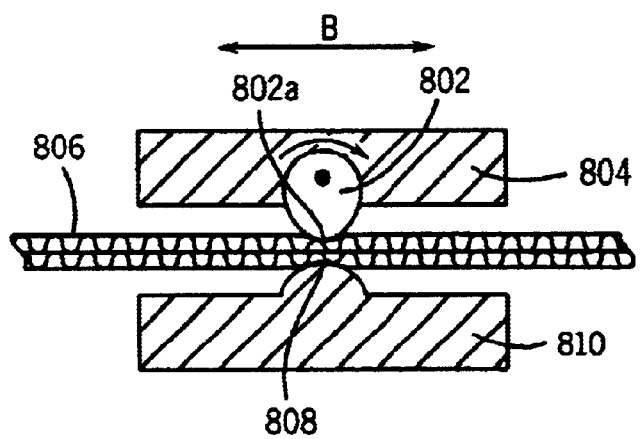
FIG. 8 illustrates a schematic of a fifth variation of the seatbelt safety lock of FIG. 1.
Figure 9:
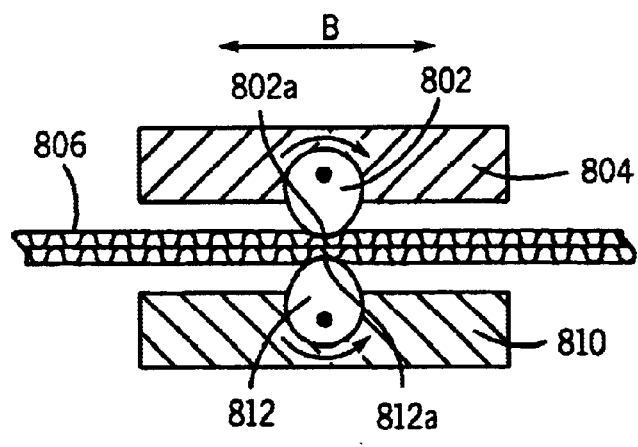
FIG. 9 illustrates a schematic of a sixth variation of the seatbelt safety lock of FIG. 1.

Other manually operated locking versions of the present invention include a single or double cam arrangement as shown in FIGS. 8 and 9, respectively. FIG. 8 shows the single cam arrangement where a cam 802 rotatably disposed on one of the body halves 804, when rotated to an offset position (shown), clamps the seatbelt 806 between the cam surface 802a and a protruding surface 808 on the other body portion 810. Alternatively, each body portion 804, 810 can have a cam 802, 812 offset from a central axis such that when both are rotated to an offset position (shown), the seatbelt 806 is clamped in between the outer surfaces 802a, 812a of the cams 802, 812. Those skilled in the art will appreciate that if the cams rotate in the direction of axial movement of the seatbelt, that the more the seatbelt moves in the axial direction, the tighter the clamping will be.

In a forth embodiment of the invention, the seatbelt is locked in the axial direction by providing an override to the seatbelt inertia lock which locks the seatbelt upon deceleration of the vehicle. Typically the seatbelts are taken up on a spool and the spool has a means for locking upon deceleration, such as a ratchet system. When not decelerating, or not decelerating above a certain threshold value, the seatbelt can be extended in the axial direction to give a person wearing the seatbelt some mobility. The override mechanism would either lock the spool from rotating or lock the inertia mechanism in the locked spool position, thereby preventing axial movement of the seatbelt regardless of the deceleration of the vehicle.

Current seatbelt mechanisms usually consist of a belt take up wheel (or spool) with a shaft that is attached to the mechanism frame. The mechanism frame is in turn attached to the vehicle structure. A tension spring or an electric motor is used to take up the loose seat belt for proper positioning over the passenger body. If the seat belt is pulled out of the take up wheel very suddenly, i.e., if the body is accelerated forward above a certain level, a locking mechanism is activated and locks the take up wheel to the mechanism body, thereby preventing any more belt to be releases. As the result, the passenger body is constrained to the vehicle seat and is prevented from being thrown forward. The locking mechanism of the take up wheel is usually activated by an inertia operated locking mechanism, i.e., a mechanism in which the experienced acceleration acts on some mass, thereby generating a force that is generally proportional to the level of experienced acceleration. When a prescribed acceleration level is reached, the generated inertia force overcomes a preloaded spring force, which normally keeps the locking mechanism disengaged. As the result, the locking mechanism engages the take up wheel and locks it to the structure of the seatbelt mechanism, i.e., prevents anymore belt from being released. In certain designs, acceleration sensors have been used to sense the vehicle deceleration and in some cases acceleration in one or more directions and activate the take up wheel locking mechanism if certain acceleration or deceleration level is reached.

In all current seatbelt mechanisms with take up wheel, the seat belt may be pulled out slowly without activating the take up wheel locking mechanism. As the result, when used to hold child seats, it would allow the child seat to move from its intended secure position as the result of relatively slow movements of the child or the vehicle. As the result, it becomes possible that the child seat to be thrown forward and/or to the side and/or up away from the seat, thereby making it possible that the child be injured in case of an accident. Similar situations may also arise when an adult passenger is sleep or is not fully alert or otherwise incapable of making rational decisions and therefore may put himself/ herself in a similar situation, i.e., with certain level of looseness of the seatbelt while seated in the vehicle. Similar situations may also arise in the case of riding animals, objects held by the seatbelt, or the like. Most child seat manufacturers provide an H shaped type of element that can be used to lock the seat belt portions before and after the seat buckle together. As the result, the length of the seatbelt between its attachment point to the vehicle and the seat buckle is prevented from increasing, thereby preventing this portion of the seat belt from becoming loose. However, the portion of the seatbelt from the seatbelt buckle to the seatbelt take up wheel mechanism may still be loosened by slowly moving child or vehicle. As the result, the child seat may not stay securely held to the vehicle seat, thereby making it possible for the child to be injured during an accident by being thrown forward, to the side or up. In addition, proper installation of H shaped elements is very cumbersome and as the result, many child seat users do not even attempt to install them.

The objective of the fourth embodiment of the present invention is to provide the means to manually lock the take up wheel of seatbelt mechanisms to their frames. Here, by manual, any direct manual actuation mechanism or indirect actuation through an electrical signal or the like that is manually activated is intended to be represented. As the result, the take up wheel may be locked after the seat belt has been properly secured to the child seat or any other person, animal or object. The aforementioned seatbelt locking H shaped elements would therefore be no longer necessary for securing the child seat, human, animal or object.

In general, two basic methods and related means may be used to manually lock the take up wheel to its frame, thereby preventing any more seatbelt to be released. The first method uses a locking element that physically prevents the rotation of the take up wheel relative to its frame. The mechanism that operates such locking element must be fixed to the take up wheel frame. When desired, the locking element is manually moved to its locking position to lock the take up wheel to its frame. The second method consists of a means to manually move the aforementioned inertia or motor activated take up wheel locking element (which is normally disengaged from the take up wheel) to its locking position and thereby locking the take up wheel to its frame.

Those skilled in the art will appreciate that the first third embodiments disclosed herein can be either configured to clamp onto existing seatbelts or be integrally made with one of the male or female seatbelt buckles. Furthermore, as used in the attached claims, "seatbelt buckle" refers to one of the male or female buckles, not to the combination of the male and female buckles. In the integral configuration, a means can also be provided to unclamp the seatbelt upon the disengagement of the male buckle from the female buckle, such as (in the case of the rotating cam(s) version) connecting a ratchet mechanism to the disengagement button of the seatbelt which when depressed rotates the cam(s) from their offset position.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An apparatus for clamping together a first and second web of a vehicle seatbelt, the apparatus comprising;
   a first body portion;
   at least a second body portion connected at least intermediately to the first body portion;
   a clamping means for clamping the first, and second body portions such that a transverse portion of the first and second webs is captured between the first and second body portions;

at least one locking member movably connected to at least one of the first and second body portions to prevent axial movement of the first and second webs;

wherein the at least one locking member is movably connected to one of the first and second body portions such that an axial movement of at least one of the first and second webs moves the at least one locking member into a locking engagement with the other of the first and second body portions thereby preventing further axial movement of the first and second webs.

2. The apparatus according to claim 1, wherein the first and second body portions are connected by way of a hinge, the hinge being disposed at a first end of each of the first and second body portions.

3. The apparatus according to claim 2, wherein the clamping means comprises a lever rotatably connected to one of the first and second body portions and a corresponding latch fixed to the other of the first and second body portions, the first and second body portions being clamped together upon the engagement of a free end of the lever with the latch.

4. The apparatus according to claim 1, wherein the at least one locking member is rotatably connected to one of the first and second body portions.

5. The apparatus according to claim 4, wherein the at least one locking member is pivoted to the first body portion, the second body portion having a recess for accepting the at least one locking member therein, the recess having at least one edge such that the axial movement of at least one of the first and second webs causes the at least one locking member to abut and pinch the at least one edge with the first and second webs sandwiched there between.

6. The apparatus according to claim 1, wherein the at least one locking member is translationally connected to one of the first and second body portions.

7. The apparatus according to claim 6, wherein the at least one locking member is in a slot in the first body portion, the second body portion having at least one edge such that the translational movement of at least one of the first and second webs causes the at least one locking member to abut and pinch the at least one edge with the first and second webs sandwiched there between.

8. The apparatus according to claim 1, wherein the at least one locking member has a surface in contact with one of the first and second webs having an increased coefficient of friction to facilitate its movement with the axial movement of at least one of the first and second webs.

9. The apparatus according to claim 8, wherein the surface is an elastomer coating.

10. The apparatus according to claim 8, wherein the surface is roughened to increase its coefficient of friction.

11. The apparatus according to claim 10, wherein the at least one locking member comprises first and second cams rotatably disposed in the first and second body portions, respectively, each of the first and second cams rotating about an axis offset from its central axis, the first and second webs being sandwiched between the first and second cams when the cams are rotated to engage each other.

12. The apparatus according to claim 11, further comprising means for counter rotating one of the first and second cams upon rotation of the other of the first and second cams.

13. The apparatus according to claim 12, wherein the means for counter-rotating comprises first and second gears connected to the first and second cams, respectively, and meshingly engaged to cause counter-rotation of one of the first and second cams upon rotation of the other of the first and second cams.

14. The apparatus according to claim 13, further comprising a knob connected to one of the first and second cams for facilitating their rotation.

15. The apparatus according to claim 1, wherein the at least one locking member comprises a cam rotatably disposed in one of the first and second body portions, the cam rotating about an axis offset from its central axis, the other of the first and second body portions having a protruding surface, the first and second webs being sandwiched between the cam and protruding surface when the cam is rotated to engage the protruding surface.

16. The apparatus according to claim 15, further comprising a knob connected to the cam for facilitating its rotation.

17. The apparatus according to claim 1, wherein the first and second body portions are directly connected.

18. A seatbelt buckle for clamping together a first and second web of a vehicle seatbelt, the seatbelt buckle comprising;

a body portion for containing the first and second webs in a transverse direction;

at least one locking member movably connected to the body portion to prevent axial movement of the first and second webs through the body portion;

wherein the locking member is movably connected to the body portion such that an axial movement of at least one of the first and second webs moves the locking member into a locking engagement with the body portion thereby preventing further axial movement of the first and second webs.

19. The seatbelt buckle according to claim 18, wherein the locking member is rotatably connected to the body portion.

20. The seatbelt buckle according to claim 18, wherein the locking member is translationally connected to the body portion.

21. The seatbelt buckle according to claim 18, wherein the at least one locking member comprises a cain rotatably disposed in the body portion, the cam rotating about an axis offset from its central axis, the body portion having a protruding surface, the first and second webs being sandwiched between the cam and protruding surface when the cam is rotated to engage the protruding surface.

22. The seatbelt buckle according to claim 18, wherein the at least one locking member comprises first and second cams rotatably disposed in the body portion, each of the first and second cam is rotating about an axis offset from its central axis, the first and second webs being sandwiched between the first and second cams when the cams are rotated to engage each other.

23. The seatbelt buckle according to claim 22, further comprising means for counter rotating one of the first and second cams upon rotation of the other of the first and second cams.

24. The apparatus according to claim 23, wherein the means for counter-rotating comprises first and second gears connected to the first and second cams, respectively, and meshingly engaged to cause counter-rotation of one of the first and second cams upon rotation of the other of the first and second cams.

25. The apparatus according to claim 18, further comprising means for automatically disengaging the at least one locking member upon the disengagement of the seatbelt buckle with a mating seatbelt buckle.

26. An apparatus for clamping together a first and second web of a vehicle seatbelt, the apparatus comprising;

a first body portion;

at least a second body portions wherein the first and second body portions are connected by way of a hinge, the hinge being a disposed at a first end of each of the first and second body portions;

a clamping means for clamping the first and second body portions such that a transverse portion of the first and second webs is captured between the first and second body portions;

at least one locking member disposed on at least one of the one of the first and second body portions to prevent axial movement of the first and second webs;

wherein the clamping means comprises a lever rotatably connected to one of the first and second body portions and a corresponding latch fixed to the other of the first and second body portions, the first and second body portions being clamped together upon the engagement of a free end of the lever with the latch.

27. The apparatus according to claim 26, wherein the at least one locking member comprises; a v-shaped protrusion disposed on one of the first and second body portions and protruding towards the other of the first and second body portions; and a v-shaped cavity disposed on the other of the first and second body portions and mating with the v-shaped protrusion to clamp the transverse portion of the first and second webs between the v-shaped protrusion and the v-shaped cavity.

* * * * *